No. 897,166. PATENTED AUG. 25, 1908.
W. SHURTLEFF.
ELECTRIC MOTOR.
APPLICATION FILED MAY 21, 1907.
2 SHEETS—SHEET 1.
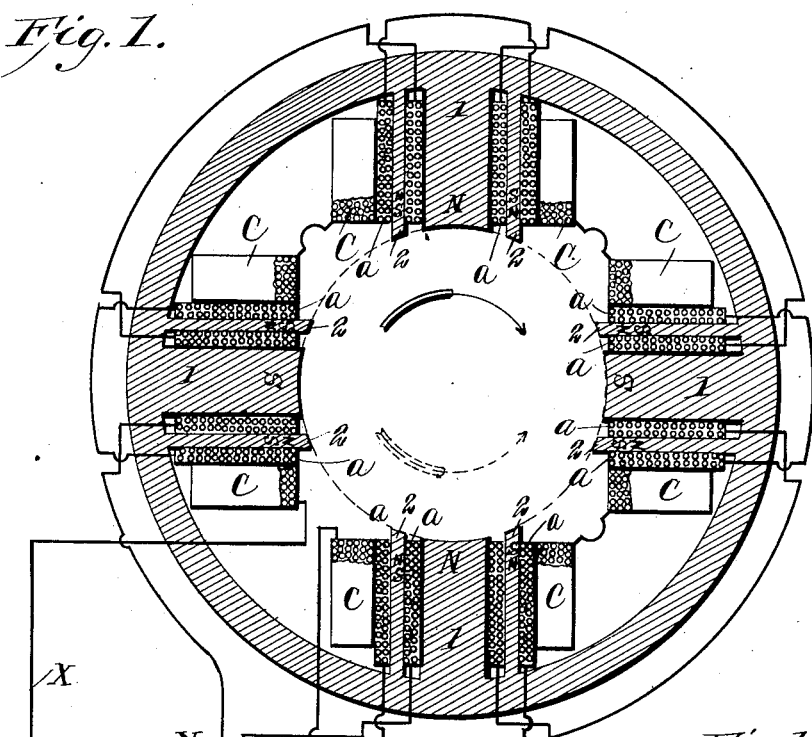
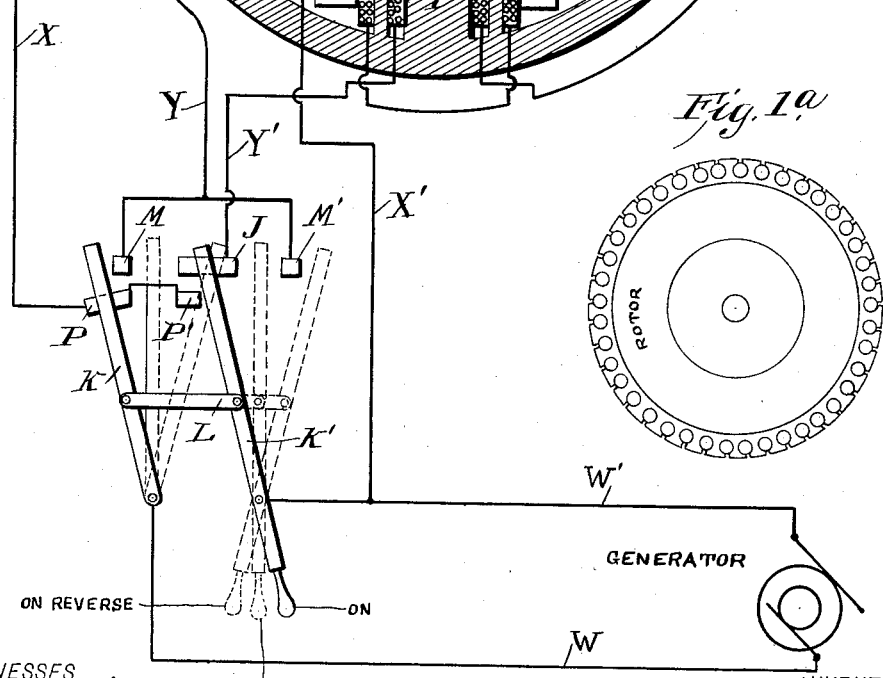
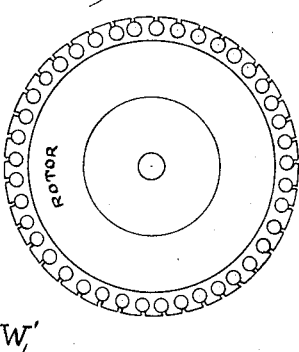
WITNESSES
E. M. Callaghan
Edw. U. Byrn
INVENTOR
WILFRED SHURTLEFF
BY Munn & Co.
ATTORNEYS.

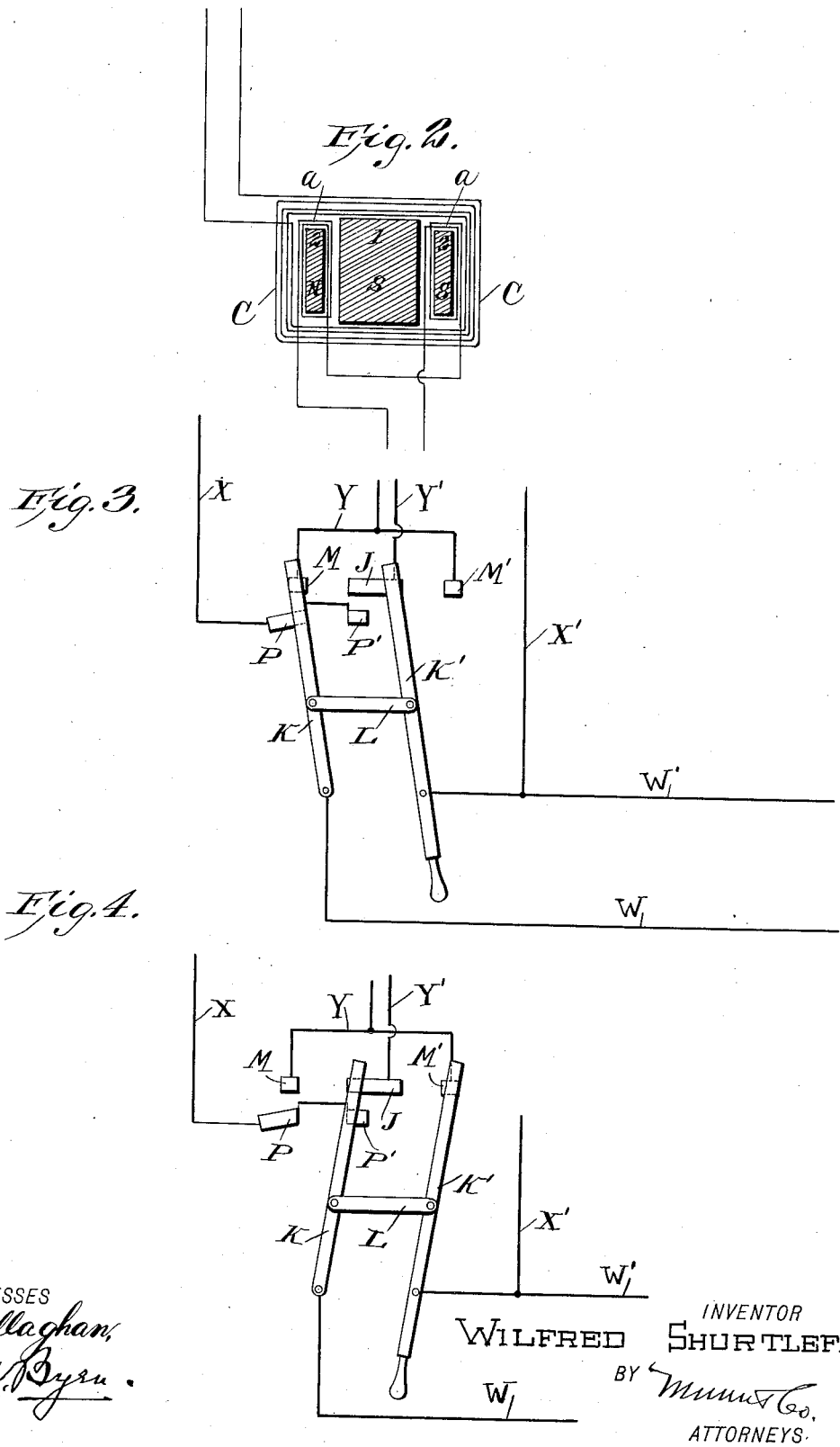

UNITED STATES PATENT OFFICE.

WILFRED SHURTLEFF, OF MOLINE, ILLINOIS.

ELECTRIC MOTOR.

No. 897,166.   Specification of Letters Patent.   Patented Aug. 25, 1908.

Application filed May 21, 1907. Serial No. 374,922.

*To all whom it may concern:*

Be it known that I, WILFRED SHURTLEFF, a citizen of the United States, and a resident of Moline, in the county of Rock Island and State of Illinois, have invented certain new and useful Improvements in Electric Motors, of which the following is a specification.

My invention is in the nature of a new form of single phase alternating current electric motors, and it consists in the novel construction and arrangement of the poles of the field magnets and the windings thereof.

The object of the invention is to make a strong starting torque and also to provide means for reversing the direction of the rotor or armature.

The field consists of two groups of poles or any number divisible by two. Each pole group consists of one large pole in the center flanked by two small poles, one on each side and parallel with the main pole. A special form of switch is arranged to send the current through the two sets of coils, as hereinafter more fully described.

In the drawing Figure 1 is a section taken through the motor field at right angles to the axis of revolution, showing also the switch and circuit wires connecting the same with the generator. Fig. 1ª is a detail in end view of the form of rotor. Fig. 2 is a sectional detail taken through one of the groups of the field magnets at right angles to their polar axis, and Figs. 3 and 4 show different positions of the switch.

The numeral 1 indicates the large central pole, and 2—2, the two flanking poles arranged parallel to the central pole, one on each side thereof. The small poles 2 are surrounded by individual coils $a$ while the larger coils C surround and inclose both the large central pole 1 and the two flanking poles 2—2 with their individual coils. The coils $a$ on the small poles 2 are wound in series and make an independent circuit used for starting purposes only. The terminals from these small coils connect at Y—Y' with the switch and are energized from the main primary circuit W, W' during the starting or reversing only, since after the rotor attains the required speed the small coils interfere with the economy of operation. The large coils C receive current through the wires X, X' from the generator through the switch and after starting, the whole group of three poles is magnetized alike by the large coil C only and have the same polar sign N N N or S S S.

The large coils C are energized at all times when the motor is running, but the windings of the small poles are as before stated used for starting and reversing purposes only. If necessary the motor could be stopped quickly and reversed by simply changing the direction of the current through the small coils $a$ without interfering with the main primary circuit through the coils C. The two small poles in each group are wound in opposite directions to each other and are energized by the main primary current from the generator. The direction of rotation of the motor could be reversed by either one of the circuits, but I prefer to use the small coil circuit except in special conditions which it is not necessary to note.

The changes in the connections can be made in many ways, but I show in Fig. 1 a simple form of switch which will start, stop and reverse the motor. It consists of two parallel conducting bars K, K' connected by an insulating plate L. These bars slide over the terminal conducting plates M, J, M' and P, P'. The plates M, M' are similar terminals of one end of the circuit of the small coils and the plate J connects with the other end of the circuit of the small coils $a$. The plates P, P' are connected together, or in electrical connection with each other, and attached to the terminal wire X of the circuit of the large coils and the other end of this circuit X' connects directly with a lead wire W' leading from the generator.

When the motor is not running the bars K, K' are left in the central position marked "Off" in Fig. 1, in which neither of said bars touch any of the subjacent plates. To start the motor running in the direction of the hands of a watch I move the bars K, K' to the left slowly to the position shown in Fig. 3, thereby making contacts on plates M, P, by the bar K, and making contact with J by bar K' closing both circuits. As the motor gets up its speed, I move the bars K, K' further to the left to the position shown in full lines in Fig. 1, which breaks contact between the bar K and the plate M and cuts out or breaks the circuit in the small starting coils $a$ but leaves the main coils C in circuit with the generator through wire X, plate P and bar K to one side of the generator and through wire X' to the other side of the generator. To cause the motor to run in the opposite direction to the hands of a watch, I move the bars K, K' to the central position marked "Off" and continue slowly toward the right to the position shown in Fig. 4, thereby making contacts on plates P' and J with bar K and plate M' with bar K'; thereby closing both circuits. The direction of the current through main primary coils C is not changed, but the direction of the current through small coils $a$ is reversed by closing their circuit by means of bar K which connects plates P' and J and bar K' which connects to plate M'. Moving now the bars K, K', to the extreme right shown by dotted lines, marked "On reverse" in Fig. 1, I break the current through coils $a$ at plate M', but I leave the main current to continue going through coils C by way of main lead X, plate P' and bar K.

The windings of the groups of poles of the field magnets are shown clearly in Fig. 2 in which the polarity when both circuits are alive is expressed as S for the center pole and N and S, respectively, for the two side poles. In Fig. 1 the poles 2 are marked as they would be with the switch in both reversed and starting conditions. In actual running the polarity for each group is always the same as N N N or S S S.

It is well known by those familiar with the art that if a plain induction motor has its field poles excited by a simple single phase current, the rapid reversal of the current will produce a torque that as rapidly reverses its direction, consequently the rotor will remain at rest, since the tendency to turn in any one direction is reversed before the rotor has time to start. But if an unbalanced field was produced by means of "phase coils" the rotor will be caused to turn in the direction desired, but with a comparatively weak torque, in the best designed motors, half load or less, with an enormous consumption of current at starting.

By my novel field pole construction in combination with the coils as described, I have constructed induction motors that will start with more than full load, with only slight excess of current used during starting only. The said novel construction of groups of 3 poles and coils wound as described causes a continuous, even, drag or pull on the conductors of the rotor toward the corner of the pole group that is of the same sign, or wound in the same direction as the large coil, when starting circuit is energized. After attaining a speed near synchronism the large coils, alone will maintain a torque as in any well known induction motor. Now if a switch is manipulated so as to make new connections for the starting circuit, so as to reverse the direction of the current through the starting circuit without changing the direction through the running coil circuit, (the motor is supposed to be running full speed same as hands of a watch), it will produce a drag or pull on the conductors of the rotor in an opposite direction from before. As the running torque is weaker than the starting torque, the motor will be caused to stop more quickly than if the current had been shut off from the source of supply. If the current is left on both circuits after stopping, the rotor will start and run in an opposite direction from the hands of a watch. I can use any well known form of "rotor" with "closed circuit conductors" that is practical for single phase motors and induction motors, as the rotor has no new coöperation with the field pole structure. I prefer to use, however, in a motor with four pole groups as shown and described, the well known squirrel cage type of rotor, as seen in Fig. 1$^a$, with 41 closed conductor bars of copper of suitable size to carry the current generated in them without heating very much. My motor starts without any noise whatever and has a steady pull, like motors using direct current. By referring to the drawings and specifications, it is apparent that each group always has one of the small poles acting in conjunction with the large pole, and one of the small poles opposing the other small pole and large pole.

This arrangement of motor and switch makes a simple and sure starting device with a powerful torque, and also makes it possible to run the motor in either direction.

I claim—

1. An electric motor, comprising field magnets consisting of groups of three poles, the larger central pole being flanked on either side by two small poles, the small poles being individually wound in opposite directions and connected to a primary circuit, a winding for the main circuit inclosing both the central pole and the coils of the flanking poles, and means for sending a current through the same, substantially as described.

2. An alternating current motor, comprising a field construction having groups of three poles of which two small poles flank the large middle pole, the small poles being wound in opposite directions to each other and connected in a separate series circuit independent of the energizing force in the large primary circuit and a switch with means of controlling the energizing force in the small pole circuit.

3. An electric motor having starting and reversing coils, and a switch connected thereto and having contact plates arranged to close and break the starting circuit during the act of closing the circuit in the main primary coils, substantially as set forth.

WILFRED SHURTLEFF.

Witnesses:
S. S. CROMPTON,
H. W. KENYON.